United States Patent

[11] 3,540,648

[72] Inventor Charles G. McGee
602 E. Park Ave., Elmhurst, Illinois 60126

[21] Appl. No. 732,687
[22] Filed May 28, 1968
[45] Patented Nov. 17, 1970

[54] SLIDE CALCULATOR FOR DIRECT ADDITION AND/OR SUBTRACTION OF INTEGER QUALITIES IN TWO NUMBER SYSTEMS
5 Claims, 7 Drawing Figs.

[52] U.S. Cl. .......... 235/89
[51] Int. Cl. .......... G06c 3/00
[50] Field of Search .......... 235/89, 70; 35/30, 31, 35.8, 31.2, 31.5, 75

[56] References Cited

UNITED STATES PATENTS 2,334,725 11/1943 Perkins .......... 235/70
3,023,956 3/1962 Rondthaler .......... 235/89
3,083,906 4/1963 Giuntini .......... 235/89
3,377,717 4/1968 Rowe .......... 235/89

FOREIGN PATENTS 23,971 9/1959 Australia .......... 235/89

*Primary Examiner*—Richard B. Wilkinson
*Assistant Examiner*—Stanley A. Wal
*Attorney*—Edwin Phelps

ABSTRACT: The essential concept of this invention involves an improved form of calculator having relatively shiftable elements each bearing a set of geometrically positioned numerals of the same or different number systems whereby the relative shifting of the two elements accomplishes arithmetic operations.

INVENTOR:
CHARLES G. McGEE
BY Edwin Phelps
ATT'Y

FIG. 5

A

| | | | | | | | | | | | | | | | | | | | | | | | | | | | | | | | |
|---|---|---|---|---|---|---|---|---|---|---|---|---|---|---|---|---|---|---|---|---|---|---|---|---|---|---|---|---|---|---|---|
| 00 | 01 | 02 | 03 | 04 | 05 | 06 | 07 | 08 | 09 | 0A | 0B | 0C | 0D | 0E | 0F | 10 | 11 | 12 | 13 | 14 | 15 | 16 | 17 | 18 | 19 | 1A | 1B | 1C | 1D | 1E | 1F |
| 10 | 11 | 12 | 13 | 14 | 15 | 16 | 17 | 18 | 19 | 1A | 1B | 1C | 1D | 1E | 1F | 20 | 21 | 22 | 23 | 24 | 25 | 26 | 27 | 28 | 29 | 2A | 2B | 2C | 2D | 2E | 2F |
| 20 | 21 | 22 | 23 | 24 | 25 | 26 | 27 | 28 | 29 | 2A | 2B | 2C | 2D | 2E | 2F | 30 | 31 | 32 | 33 | 34 | 35 | 36 | 37 | 38 | 39 | 3A | 3B | 3C | 3D | 3E | 3F |
| 30 | 31 | 32 | 33 | 34 | 35 | 36 | 37 | 38 | 39 | 3A | 3B | 3C | 3D | 3E | 3F | 40 | 41 | 42 | 43 | 44 | 45 | 46 | 47 | 48 | 49 | 4A | 4B | 4C | 4D | 4E | 4F |
| 40 | 41 | 42 | 43 | 44 | 45 | 46 | 47 | 48 | 49 | 4A | 4B | 4C | 4D | 4E | 4F | 50 | 51 | 52 | 53 | 54 | 55 | 56 | 57 | 58 | 59 | 5A | 5B | 5C | 5D | 5E | 5F |
| 50 | 51 | 52 | 53 | 54 | 55 | 56 | 57 | 58 | 59 | 5A | 5B | 5C | 5D | 5E | C<br>5F | 60 | 61 | 62 | 63 | 64 | 65 | 66 | 67 | 68 | 69 | 6A | 6B | 6C | 6D | 6E | 6F |
| 60 | 61 | 62 | 63 | 64 | 65 | 66 | 67 | 68 | 69 | 6A | 6B | 6C | 6D | 6E | 6F | 70 | 71 | 72 | 73 | 74 | 75 | 76 | 77 | 78 | 79 | 7A | 7B | 7C | 7D | 7E | 7F |
| 70 | 71 | 72 | 73 | 74 | 75 | 76 | 77 | 78 | 79 | 7A | 7B | 7C | 7D | 7E | 7F | 80 | 81 | 82 | 83 | 84 | 85 | 86 | 87 | 88 | 89 | 8A | 8B | 8C | 8D | 8E | 8F |
| 80 | 81 | 82 | 83 | 84 | 85 | 86 | 87 | 88 | 89 | 8A | 8B | 8C | 8D | 8E | 8F | 90 | 91 | 92 | 93 | 94 | 95 | 96 | 97 | 98 | 99 | 9A | 9B | 9C | 9D | 9E | 9F |
| 90 | 91 | 92 | 93 | 94 | 95 | 96 | 97 | 98 | 99 | 9A | 9B | 9C | 9D | 9E | 9F | A0 | A1 | A2 | A3 | A4 | A5 | A6 | A7 | A8 | A9 | AA | AB | AC | AD | AE | AF |
| A0 | A1 | A2 | A3 | A4 | A5 | A6 | A7 | A8 | A9 | AA | AB | AC | AD | AE | AF | B0 | B1 | B2 | B3 | B4 | B5 | B6 | B7 | B8 | B9 | BA | BB | BC | BD | BE | BF |
| B0 | B1 | B2 | B3 | B4 | B5 | B6 | B7 | B8 | B9 | BA | BB | BC | BD | BE | BF | C0 | C1 | C2 | C3 | C4 | C5 | C6 | C7 | C8 | C9 | CA | CB | CC | CD | CE | CF |
| C0 | C1 | C2 | C3 | C4 | C5 | C6 | C7 | C8 | C9 | CA | CB | CC | CD | CE | CF | D0 | D1 | D2 | D3 | D4 | D5 | D6 | D7 | D8 | D9 | DA | DB | DC | DD | DE | DF |
| D0 | D1 | D2 | D3 | D4 | D5 | D6 | D7 | D8 | D9 | DA | DB | DC | DD | DE | DF | E0 | E1 | E2 | E3 | E4 | E5 | E6 | E7 | E8 | E9 | EA | EB | EC | ED | EE | EF |
| E0 | E1 | E2 | E3 | E4 | E5 | E6 | E7 | E8 | E9 | EA | EB | EC | ED | EE | EF | F0 | F1 | F2 | F3 | F4 | F5 | F6 | F7 | F8 | F9 | FA | FB | FC | FD | FE | FF |
| F0 | F1 | F2 | F3 | F4 | F5 | F6 | F7 | F8 | F9 | FA | FB | FC | FD | FE | FF | 100 | 101 | 102 | 103 | 104 | 105 | 106 | 107 | 108 | 109 | 10A | 10B | 10C | 10D | 10E | 10F |
| 100 | 101 | 102 | 103 | 104 | 105 | 106 | 107 | 108 | 109 | 10A | 10B | 10C | 10D | 10E | 10F | 110 | 111 | 112 | 113 | 114 | 115 | 116 | 117 | 118 | 119 | 11A | 11B | 11C | 11D | 11E | 11F |
| 110 | 111 | 112 | 113 | 114 | 115 | 116 | 117 | 118 | 119 | 11A | 11B | 11C | 11D | 11E | 11F | 120 | 121 | 122 | 123 | 124 | 125 | 126 | 127 | 128 | 129 | 12A | 12B | 12C | 12D | 12E | 12F |
| 120 | 121 | 122 | 123 | 124 | 125 | 126 | 127 | 128 | 129 | 12A | 12B | 12C | 12D | 12E | 12F | 130 | 131 | 132 | 133 | 134 | 135 | 136 | 137 | 138 | 139 | 13A | 13B | 13C | 13D | 13E | 13F |
| 130 | 131 | 132 | 133 | 134 | 135 | 136 | 137 | 138 | 139 | 13A | 13B | 13C | 13D | 13E | 13F | 140 | 141 | 142 | 143 | 144 | 145 | 146 | 147 | 148 | 149 | 14A | 14B | 14C | 14D | 14E | 14F |
| 140 | 141 | 142 | 143 | 144 | 145 | 146 | 147 | 148 | 149 | 14A | 14B | 14C | 14D | 14E | 14F | 150 | 151 | 152 | 153 | 154 | 155 | 156 | 157 | 158 | 159 | 15A | 15B | 15C | 15D | 15E | 15F |
| 150 | 151 | 152 | 153 | 154 | 155 | 156 | 157 | 158 | 159 | 15A | 15B | 15C | 15D | 15E | 15F | 160 | 161 | 162 | 163 | 164 | 165 | 166 | 167 | 168 | 169 | 16A | 16B | 16C | 16D | 16E | 16F |
| 160 | 161 | 162 | 163 | 164 | 165 | 166 | 167 | 168 | 169 | 16A | 16B | 16C | 16D | 16E | 16F | 170 | 171 | 172 | 173 | 174 | 175 | 176 | 177 | 178 | 179 | 17A | 17B | 17C | 17D | 17E | 17F |
| 170 | 171 | 172 | 173 | 174 | 175 | 176 | 177 | 178 | 179 | 17A | 17B | 17C | 17D | 17E | 17F | 180 | 181 | 182 | 183 | 184 | 185 | 186 | 187 | 188 | 189 | 18A | 18B | 18C | 18D | 18E | 18F |
| 180 | 181 | 182 | 183 | 184 | 185 | 186 | 187 | 188 | 189 | 18A | 18B | 18C | 18D | 18E | 18F | 190 | 191 | 192 | 193 | 194 | 195 | 196 | 197 | 198 | 199 | 19A | 19B | 19C | 19D | 19E | 19F |
| 190 | 191 | 192 | 193 | 194 | 195 | 196 | 197 | 198 | 199 | 19A | 19B | 19C | 19D | 19E | 19F | 1A0 | 1A1 | 1A2 | 1A3 | 1A4 | 1A5 | 1A6 | 1A7 | 1A8 | 1A9 | 1AA | 1AB | 1AC | 1AD | 1AE | 1AF |
| 1A0 | 1A1 | 1A2 | 1A3 | 1A4 | 1A5 | 1A6 | 1A7 | 1A8 | 1A9 | 1AA | 1AB | 1AC | 1AD | 1AE | 1AF | 1B0 | 1B1 | 1B2 | 1B3 | 1B4 | 1B5 | 1B6 | 1B7 | 1B8 | 1B9 | 1BA | 1BB | 1BC | 1BD | 1BE | 1BF |
| 1B0 | 1B1 | 1B2 | 1B3 | 1B4 | 1B5 | 1B6 | 1B7 | 1B8 | 1B9 | 1BA | 1BB | 1BC | 1BD | 1BE | 1BF | 1C0 | 1C1 | 1C2 | 1C3 | 1C4 | 1C5 | 1C6 | 1C7 | 1C8 | 1C9 | 1CA | 1CB | 1CC | 1CD | 1CE | 1CF |
| 1C0 | 1C1 | 1C2 | 1C3 | 1C4 | 1C5 | 1C6 | 1C7 | 1C8 | 1C9 | 1CA | 1CB | 1CC | 1CD | 1CE | 1CF | 1D0 | 1D1 | 1D2 | 1D3 | 1D4 | 1D5 | 1D6 | 1D7 | 1D8 | 1D9 | 1DA | 1DB | 1DC | 1DD | 1DE | 1DF |
| 1D0 | 1D1 | 1D2 | 1D3 | 1D4 | 1D5 | 1D6 | 1D7 | 1D8 | 1D9 | 1DA | 1DB | 1DC | 1DD | 1DE | 1DF | 1E0 | 1E1 | 1E2 | 1E3 | 1E4 | 1E5 | 1E6 | 1E7 | 1E8 | 1E9 | 1EA | 1EB | 1EC | 1ED | 1EE | 1EF |
| 1E0 | 1E1 | 1E2 | 1E3 | 1E4 | 1E5 | 1E6 | 1E7 | 1E8 | 1E9 | 1EA | 1EB | 1EC | 1ED | 1EE | 1EF | 1F0 | 1F1 | 1F2 | 1F3 | 1F4 | 1F5 | 1F6 | 1F7 | 1F8 | 1F9 | 1FA | 1FB | 1FC | 1FD | 1FE | 1FF |

*HEXADECIMAL*

INVENTOR:
CHARLES G. McGEE
BY
[signature]
ATT'Y

Patented Nov. 17, 1970

3,540,648

INVENTOR:
CHARLES G. McGEE
BY
ATT'Y

SLIDE CALCULATOR FOR DIRECT ADDITION AND/OR SUBTRACTION OF INTEGER QUALITIES IN TWO NUMBER SYSTEMS

The numerals of the two elements must be geometrically positioned in a common relation to some single unit of measure. As a result, there will be an arithmetic relation between numerals on a fixed element and adjacent ones on the movable element. The particular arithmetic relation will depend upon the relative position of the movable element on the base and by proper positioning, to permit calculations to be carried out in number and unit systems unfamiliar to the user.

Modern computer technology has forced the use of number systems other than decimal. Most computer systems operate with the binary system and, to conserve space, results of certain operations are often provided in the octal (base 8) or hexadecimal (base 16) number systems. Some elementary school children have exercises in the base 7 system.

For comparison, the following table shows the numerals which represent a few different quantities in several different number systems:

| Quantity | Decimal | Binary | Base 7 | Octal | Hexadecimal | Roman |
|---|---|---|---|---|---|---|
| . | 1 | 1 | 1 | 1 | 1 | I |
| : | 2 | 10 | 2 | 2 | 2 | II |
| ::. | 5 | 101 | 5 | 5 | 5 | V |
| :::. | 7 | 111 | 10 | 7 | 7 | VII |
| ::::: | 10 | 1019 | 13 | 12 | A | X |

While ::. dots plus ::. dots is always ::::: dots, the rules for arithmetic are different in the different number systems.

Decimal—5+5=10
Binary—101+101=1010
Base 7—5+5=13
Octal—5+5=12
Hexadecimal—5+5=A
Roman—V+V=X One application of the calculators described herein is to permit addition and subtraction to be carried out in different number systems without requiring knowledge of the arithmetic rules of the particular number system.

A second application of these calculators is to permit addition and subtraction to be carried out with the numerals from two different number systems; for example 5 (decimal) + V(Roman) = X(Roman), without requiring conversion to a common number system before carrying out the arithmetic operation.

A third application of these calculators is in operations on quantities expressed in different units. Dimes can be added to nickels to give the sum in nickels without the user knowing anything about the relative value of the two units.

The use of this calculator speeds calculations in number and unit systems unfamiliar to the user and would assist in explaining the properties of number and unit systems to students.

As an example, consider the two sets of decimal numerals below

| | | | | | | | |
|---|---|---|---|---|---|---|---|
| Set 1 | 43 | 44 | 45 | 46 | 47 | 48 | 49 |
| Set 2 | 0 | 1 | 2 | 3 | 4 | 5 | 6 |

The member elements of each of these two sets are positioned so that the distance between members is proportional to the difference between them. This is a linear spacing. As a result of this geometrical positioning, there is a constant arithmetic relationship between the member of Set 1 and the members of Set 2 directly below. In the position shown, every member of Set 1 is 43 greater than the corresponding member of Set 2. If Set 2 were moved one position to the right, the difference would be 44. Such an arrangement of sets can be used to add by moving the lower set zero under one of the two numbers to be added and reading the sum above the second addend (43+5=48).

As an example of sets having different units of measure, consider a set of numerals representing nickels and another set representing dimes, the elements of each of the two sets positioned so that the distance between them is proportional to the difference in pennies.

| | | | | | | | | |
|---|---|---|---|---|---|---|---|---|
| Set 1 (nickels) | 3 | 4 | 5 | 6 | 7 | 8 | 9 | 10 |
| Set 2 (dimes) | 0 | ------ | 1 | ------ | 2 | ------ | 3 | ------ |

A calculator based on these sets gives a direct answer to a problem such as: find how many nickels there are in 3 nickels and 2 dimes. The answer, 7, is in the nickel set directly above the 2 in the dimes set. The user of the calculator does not have to know that one dime is equivalent to 2 nickels, the geometric positioning of the set elements performs unit conversions directly.

This kind of calculator can be used with discontinuous sets. Consider the problem of determining the hour which is 5 hours after 9 o'clock The set of hours on the clock goes from 1 to 12 and then repeats, with a discontinuity at 1 o'clock.

| | | | | | | | | |
|---|---|---|---|---|---|---|---|---|
| Set 1 (clock hours) | 8 | 9 | 10 | 11 | 12 | 1 | 2 | 3 |
| Set 2 (time hours) | | 0 | 1 | 2 | 3 | 4 | 5 | 6 |

The calculator indicates that 5 hours after 9 o'clock is 2 o'clock (or that 5 hours before 2 o'clock was 9 o'clock). The geometric positioning of the members of the 2 sets takes care of the discontinuity in the clock hours numeral set.

With properly positioned sets of numerals, such calculators can be used for addition and subtraction by persons unfamiliar with the number systems or units involved.

In order to make this kind of calculator convenient to use, the elements of the two sets can be arranged in a two dimensional array. A necessary requirement is that the members of the lower set be visible when the upper set is positioned for a calculation. This may be accomplished by printing the upper set on a transparent material or by placing windows in it at the positions occupied by the base set.

When rectangular arrays are used, it is advisable to have the base array approximately four times as large in area as the movable element. Moreover, approximately one-half of the numerals on the base set must appear twice.

The following diagram shows how the two sets would be arranged for a calculator to add and subtract the Roman numerals from I through XI.

UPPER MOVABLE SET

| | | | |
|---|---|---|---|
| 0 | I | II | III |
| IV | V | VI | VII |
| VIII | IX | X | XI |

LOWER BASE SET

| Section A | | | | Section B | | |
|---|---|---|---|---|---|---|
| 0 | I | II | III | IV | V | VI |
| IV | V | VI | VII | VIII | IX | X |
| VIII | IX | X | XI | XII | XIII | XIV |
| XII | XIII | XIV | XV | XVI | XVII | XVIII |
| XVI | XVII | XVIII | XIX | XX | XXI | XXII |

In the lower (base) set, Section A is identical to the upper (movable) set and Section B are repeated values necessary when the movable set is positioned away from the first column of the lower set.

The main objects of this invention are; to provide an improved form of slide calculator for addition and subtraction; to provide an improved calculator of this kind for use in industrial and educational institutions; to provide an improved calculator of this kind for use in addition and subtraction between two number or unit systems where both or one of the systems are unfamiliar to the user of the calculator; to provide an improved calculator of this kind especially adapted for addition and subtraction involving decimal and hexadecimal systems used in programing computers; to provide an improved calculator of this kind equally adapted for aiding elementary school classes in understanding various number systems; to provide a calculator of this kind for addition and subtraction with any of several different types of number systems; and to provide a calculator of this kind of such simple and practical construction as to make very economical the manufacturing and marketing thereof and exceedingly facile and gratifying the use thereof by purchasers.

In the adaptation shown in the accompanying drawings;

FIG. 5 is a plan view of the entire base chart for both FIGS. 1 and 2;

Figures 1, 2, 3, 4:
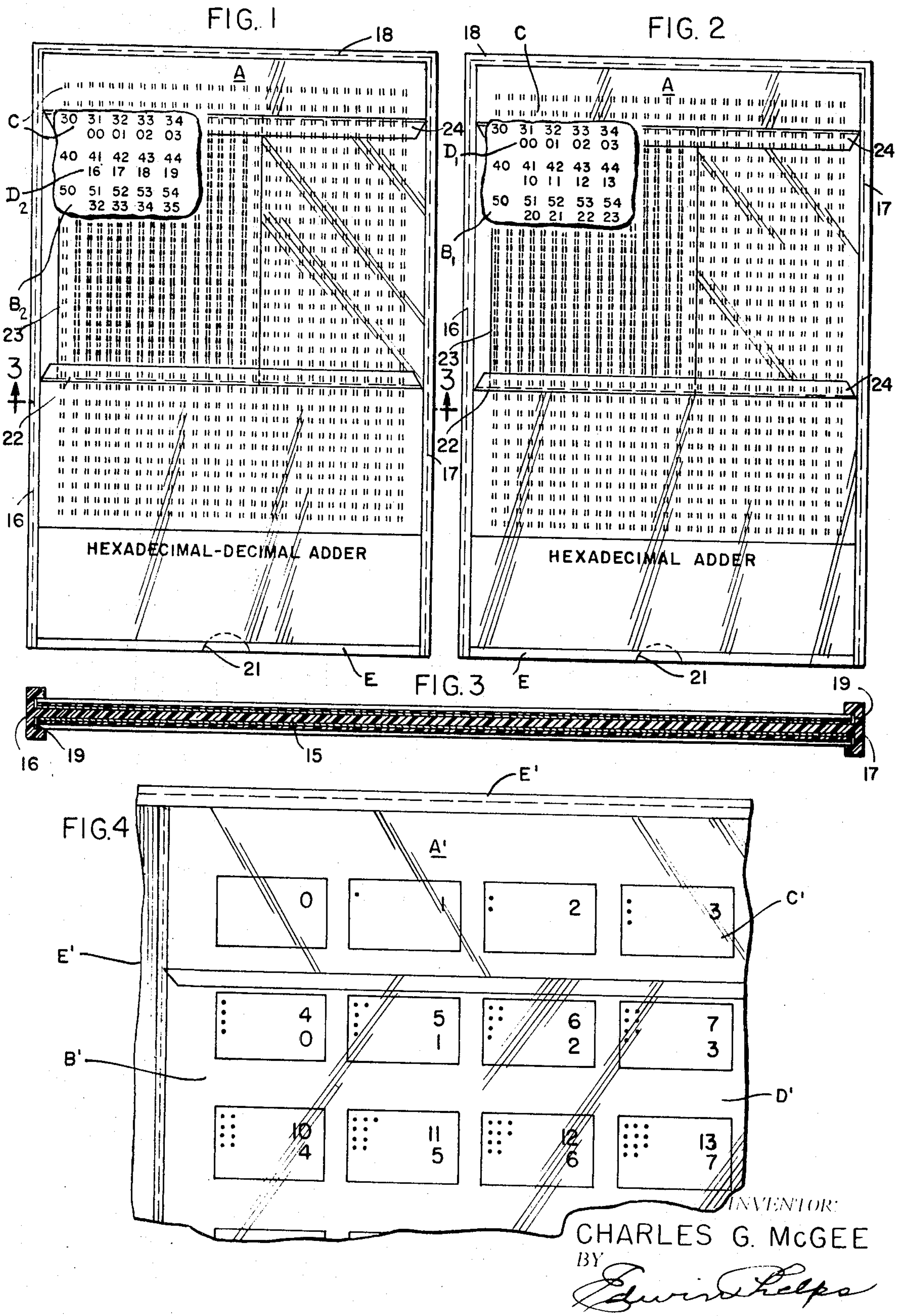
FIG. 1 is a slightly less than a one-half size plan view of the "hexadecimal-decimal adder" face of the calculator.
FIG. 2 is a similar view of the "hexadecimal adder" face of the calculator.
FIG. 3 is an enlarged transverse, cross-sectional view of the calculator taken on the plane of the line 3–3 of FIG. 1.
FIG. 4 is a plan view of a section of the upper left portion of a calculator of this type as might be developed for use in elementary grades to enable students to add or subtract objects (dots) using numerals of the octal number system.

Two exemplifications of this invention are shown and described herein. One is for commercial use and is illustrated in FIGS. 1, 2, 3, 6 and 7. The other is for use in elementary school grades and is illustrated in FIG. 4.

Each of these calculator exemplifications comprise a pair of superimposed elements A or A′ and B or B′ whereon appear the respective charts C or C′ and D or D′. The respective pairs of elements A–A′ and B–B′ are shown mounted on the opposite sides of a support E or E′. The symbols on the respective charts C and D are in geometric position in accord with a common base to permit addition and subtraction operations.

In the presently marketed form the support E is in the nature of a frame with a base section 15 integrated with a pair of lateral rims 16 and 17 and one transverse rim 18. The rims 16 and 17 are "T" shape (FIG. 3), thus providing oppositely open slots 19 on opposite faces of the base section 15. The one transverse rim 18 does need to be slotted. It serves as an abutment for limiting the insertion of the charts. The base section 15, at the open end, has an inwardly curved recess 21. This permits a finger grip on either of the elements A when one or the other, or both has to be removed for reasons to be explained later.

Figures 6, 7:
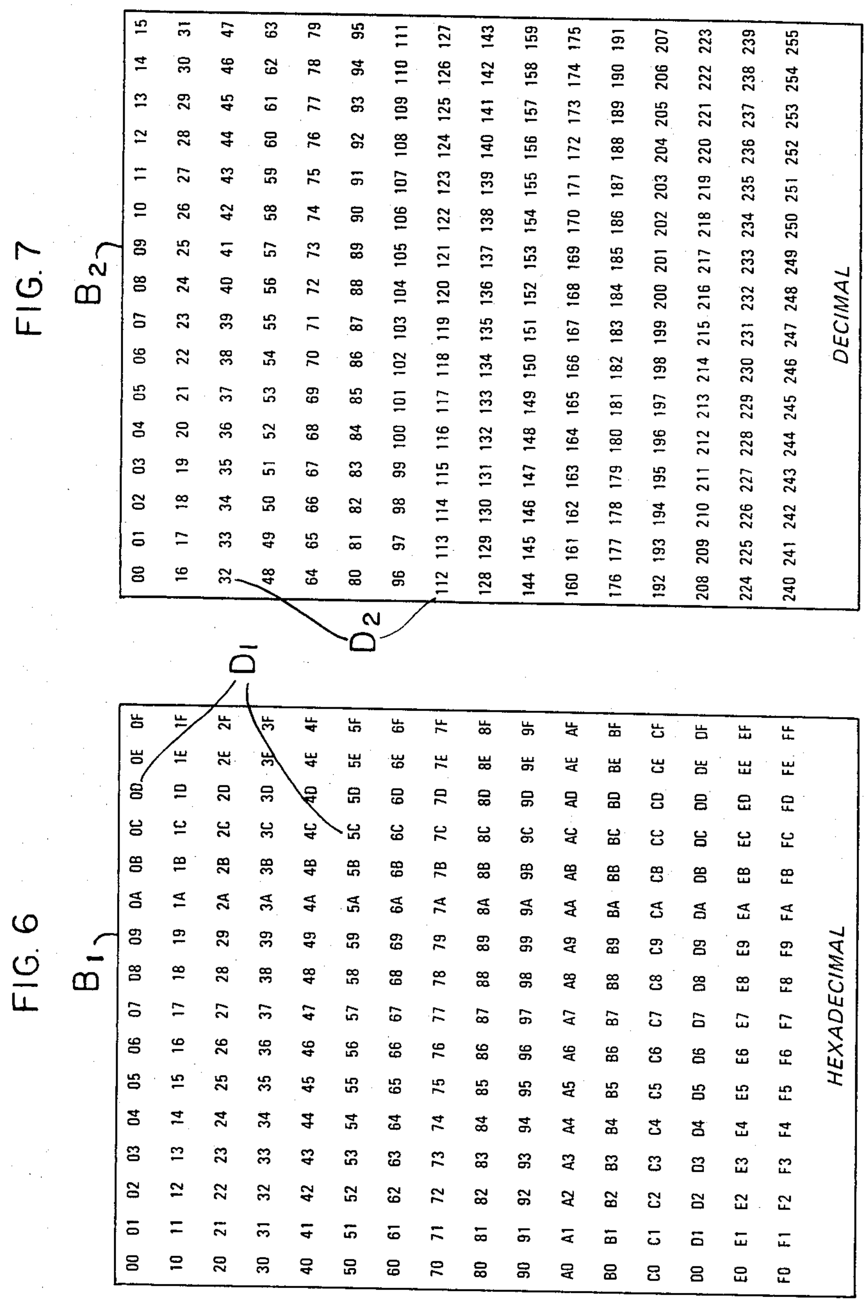
FIG. 6 is a full-size plan view of the shiftable chart for "hexadecimal-decimal" arithmetic operations.
FIG. 7 is a similar view of the shiftable chart for "hexadecimal" arithmetic operations.

The nature of the charts C, $D_1$ and $D_2$ will depend upon the nature of the number systems for which such a calculator is to be used. As herein shown and described, the illustrated calculator has been devised for addition and subtraction involving number systems of the "decimal" and "hexadecimal" type. Hence the elements A, on the opposite sides of the support E have identical charts C; namely a hexadecimal number system. The two elements A preferably are planar opaque material. The charts C printed thereon are similar left and right columns of the hexadecimal system. These range from a first line of the double zero (00) through 09 followed by the hexadecimal digits first six letters of the alphabet, A, B, C, D, E, F, each with the indicated prefix, continuing through 31 horizontal lines, the last line in the left column, begins with 1EO and ends with 1FF. However, it should be noted that in the right column the first line is the same as the second line in the left column. This results in the last line in the right column not appearing in the left column. Thus, except for the first line in the left column and last line in the right column, the left and right columns are identical. The benefits of this will be made apparent in the later-explained use of this calculator. The chart elements $B_1$ and $B_2$, as shown more clearly in FIGS. 6 and 7, are shiftably mounted the member 22. Both the chart elements and the member 22, preferably, are formed of transparent material for a reason that will be apparent presently. The most acceptable material is a conventional plastic of a flexible character sufficient to permit easy flexing for assembly on or removal from the respective elements A.

Part 22 spans the element A with its opposite perimeters slidably retained in the slots 19 of the support E. As shown at 23 and 24, the lateral edges of the part 22 are folded over inwardly to form slots for the slidable retention of the chart element $B_1$ and $B_2$ for shifting transversely of the chart C. The chart $D_2$ on one of these chart elements $B_2$ bears the numerals 00 (used as an index) through 255 of the decimal number system (FIG. 7). The chart $D_1$ (FIG. 6), on the other of these chart elements $B_1$ bears the numerals 00 (used as an index) through FF of the hexadecimal number system.

FIGS. 1 and 2 illustrate the use of this slide calculator with "decimal" and "hexadecimal" number systems. However, it should be apparent, from the foregoing part of this specification, that such shiftable tables could be arranged for use with any pair of number systems, such as those shown on pages 2, 3 and 4 of this specification. Such other pairs, for example, could be a decimal number system and Roman number system, or binary and octal number systems, or between hexadecimal and base 7 number systems. Such an arrangement of tables of the two number systems, permits a person to add or subtract in unfamiliar number systems, or to add or subtract quantities in different number systems.

With reference to these illustrations of FIGS. 1, 2, 5, 6 and 7, it should be explained that in the marketed products the charts D of the elements B are red letters, whereas the charts C are in black. It is to suggest such a distinction that the numerals in the circled magnifications of FIGS. 1 and 2, are slightly heavier in outline.

To indicate the "in use" of such a commercial type of calculator, as shown in FIGS. 1 and 2, it should be noted that FIG. 1 illustrates such a calculator as is required for use with the hexadecimal and decimal systems. FIG. 2 illustrates the charts for use with the hexadecimal and decimal systems. Thus the charts illustrated in FIGS. 5 and 6 (relating to FIG. 2) use hexadecimal numerals while the chart illustrated in FIG. 7 ($D_2$ of FIG. 1) uses the decimal numerals.

The magnifications of FIGS 1 and 2 show charts $D_1$ and $D_2$ positioned with the index positions, the double zero (00), thereon directly under the 31 of Chart C. From such relatively positioned charts it will be observed that to have 01 of either chart $D_1$ or $D_2$ added to the 31 of chart C results in 32 on chart C. Also 05 on either chart $D_1$ or $D_2$ added to 31 on chart C results in 36 on chart C. However, 20 on the decimal chart $D_2$ added to the hexadecimal 31 of chart C results in the hexadecimal sum of 45 on chart C, while 20 on the hexadecimal chart $D_1$ added to the hexadecimal 31 of chart C results in a hexadecimal sum of 51, the difference in the results being due to the difference in numbers represented by 20 in the hexadecimal and decimal number systems (20 in the hexadecimal number system being equivalent to 32 in the decimal number system).

In the event that subtractions, rather than additions are desired, the reverse of the above examples would make the results apparent.

The device in FIG. 4 is an example of the use of this kind of calculator to assist school pupils to understand number systems with bases other than 10. The specific device illustrated shows the base 8 or "octal" number system. The pupil can see that in the octal system, 4 plus 4 is equal to the octal number 10. He can also see that the number of dots indicates that there are the same quantity of items that he expects from the decimal addition of 4 and 4. Thus he can relate the decimal number 8 to the octal number 10, and so forth.

Variations and modifications in the details of structure and arrangement of the parts may be resorted to within the spirit and coverage of the appended claims.

I claim:

1. A calculating device for addition or subtraction involving integer numerals from the same or two different number systems comprising:

A support member having frame means provided around peripheral edges thereof, a first member received in the frame means, having arranged thereon, in columnar form, indicia representing the numerals of a number system; transparent means, spanning the width of the first member, slidably retained in the frame means to traverse the length of the first member, the transparent means being provided with guide slots along the upper and lower edges thereof; and a transparent second member shiftably mounted in the guide slots to traverse the width of said first member and having arranged thereon, in columnar form directly related to the columnar form of the indicia on the first member, indicia representing the numerals of the same or a different number system on the first member; whereby upon aligning the columns of the second member with columns of the first member, the pairs of numerals from the first and second members are sums or differences with respect to the index numeral of zero on the second member without conversion of the numerals to a common number system.

2. A calculating device as set forth in claim 1 wherein the first member has the same number system on opposite sides of the member and the other member has a different number system.

3. A slide calculator as set forth in claim 1 wherein the number system on the other member is the same as that on the first member.

4. A slide calculator as set forth in claim 1 wherein the number system on both members is the hexadecimal system.

5. A slide calculator as set forth in claim 1 wherein the number on one member is hexadecimal system and the number system on the other member is decimal.